(12) United States Patent
Chan

(10) Patent No.: US 6,810,821 B2
(45) Date of Patent: Nov. 2, 2004

(54) HAZARDOUS WASTE TREATMENT METHOD AND APPARATUS

(75) Inventor: Benjamin Chun Pong Chan, 62 Picola Ct., Willowdale (CA), M2H 2N3

(73) Assignees: Benjamin Chun Pong Chan, Willowdale (CA); Edmund Kin On Lau, Hong Kong (CN)

(*) Notice: Subject to any disclaimer, the term of this patent is extended or adjusted under 35 U.S.C. 154(b) by 0 days.

(21) Appl. No.: 10/431,687

(22) Filed: May 8, 2003

(65) Prior Publication Data

US 2003/0209174 A1 Nov. 13, 2003

Related U.S. Application Data

(60) Provisional application No. 60/378,357, filed on May 8, 2002.

(51) Int. Cl.[7] .............................. F23B 5/00; F23G 7/06; F23G 5/10
(52) U.S. Cl. ...................... 110/345; 110/250; 110/210
(58) Field of Search ................................ 110/345, 210, 110/250, 242, 235, 346; 219/121.36, 121.37, 121.38; 373/18

(56) References Cited

U.S. PATENT DOCUMENTS

| | | | | |
|---|---|---|---|---|
| 4,438,706 A | * | 3/1984 | Boday et al. | 588/212 |
| 4,479,443 A | * | 10/1984 | Faldt et al. | 588/210 |
| 4,615,285 A | * | 10/1986 | Bentell et al. | 588/209 |
| 5,319,176 A | * | 6/1994 | Alvi et al. | 219/121.59 |
| 5,534,659 A | * | 7/1996 | Springer et al. | 588/227 |
| 5,614,156 A | | 3/1997 | Wang | |
| 5,666,891 A | | 9/1997 | Titus et al. | |
| 5,673,285 A | | 9/1997 | Wittle et al. | |
| 5,762,009 A | | 6/1998 | Garrison et al. | |
| 5,798,496 A | | 8/1998 | Eckhoff et al. | |
| 5,811,752 A | | 9/1998 | Titus et al. | |
| 5,943,970 A | | 8/1999 | Gonopolsky et al. | |
| 5,958,264 A | | 9/1999 | Tsantrizos et al. | |
| 6,021,723 A | | 2/2000 | Vallomy | |
| 6,089,169 A | | 7/2000 | Comiskey | |

(List continued on next page.)

FOREIGN PATENT DOCUMENTS

| | | |
|---|---|---|
| EP | 0 625 869 | 11/1994 |
| EP | 0 952 393 | 10/1999 |
| FR | 2666518 | 3/1992 |
| FR | 2796517 | 1/2001 |
| WO | WO 02 068114 | 9/2002 |

OTHER PUBLICATIONS

"The Coal Reburning for Cyclone Boiler $No_x$ Control Demonstration Project," The Office of Clean Coal Technology, Pittsburgh Energy Technology Center, Sep. 1995.

(List continued on next page.)

Primary Examiner—Kenneth Rinehart
(74) Attorney, Agent, or Firm—Boyle Fredrickson Newholm Stein & Gratz, S.C.

(57) ABSTRACT

An apparatus and method for treating the off-gas byproduct of a waste treatment system using a plasma torch. The off-gas of a graphite electrode plasma arc furnace includes carbon black or soot which must be removed. The plasma torch employs a carbon dioxide and oxygen mixture as a working gas to avoid the creation of nitrogen oxides and other toxic by-products. The plasma torch ionizes the working gas, resulting in the creation of carbon monoxide and reactive oxygen, which assists in eliminating carbon black/soot from the off-gas. Oxygen and steam are atomized and injected into the chamber housing the plasma torch system. A process control feedback system monitors the content of the output gas and controls the operation of the injectors and the plasma torch.

29 Claims, 3 Drawing Sheets

U.S. PATENT DOCUMENTS

| | | | |
|---|---|---|---|
| 6,127,645 | A | 10/2000 | Cohn et al. |
| 6,153,158 | A | 11/2000 | Flannery et al. |
| 6,155,182 | A | 12/2000 | Tsangaris et al. |
| 6,173,002 | B1 | 1/2001 | Robert |
| 6,200,430 | B1 | 3/2001 | Robert |
| 6,215,678 | B1 | 4/2001 | Titus et al. |
| 6,355,904 | B1 | 3/2002 | Batdorf et al. |

OTHER PUBLICATIONS

"SPC Cyclone Melting Furnace," Kawasaki Heavy Industries Ltd., from Japanese Advanced Environment Equipment web page, undated.

Anderson, Robert A. and Richardson, Roger A., "Plasma Afterburner for Treatment of Effluents from Solid–Waste Processing," from Plasma Torch web page, last modified: Sep. 4, 1994.

S.W. Ip, PhD for Prof. R.A. Bergman, "Thermodynamic Analysis of the Falcondo Naphtha Gasification Process," Feb. 1995.

"Cyclone Melting System," from Cyclone web page, http://www.vortec–cms.com/cyclone.htm, undated.

* cited by examiner

HAZARDOUS WASTE TREATMENT METHOD AND APPARATUS

CROSS-REFERENCE TO RELATED APPLICATIONS

The present application claims priority to U.S. provisional patent application Ser. No. 60/378,357, filed May 8, 2002, and hereby incorporates the subject matter disclosed therein.

FIELD OF THE INVENTION

This invention relates to the treatment of off-gas from an industrial or hazardous waste treatment system.

BACKGROUND OF THE INVENTION

Hazardous waste affects human health by its toxicity, deflagrability, corrosivity, reactivity, and infection in addition to being a source of serious pollution. Hazardous wastes have been generally disposed of by land disposal, incineration and recycling. However, as incidents of improper waste disposal, such as emissions of toxic substances from incineration and landfills (e.g. dioxins from incineration and toxic leachate from landfills) begin to create serious health and ecological problems, public awareness has led to increasing legislation and more stringent environmental protection policies. These policies have led to search for other efficient, reliable and cost effective disposal alternatives.

A number of methods based on plasma arc have been proposed to destroy organic and inorganic hazardous waste in all forms, to convert hazardous wastes to a combustible synthetic gas for electricity generation, and to vitrify all the non-combustible materials to a stable glass which can be disposed of safely. However, these methods are considered inefficient and have very high capital and operating costs.

In general, two basic plasma arc technologies, the plasma torch (transferred and non-transferred modes) and the graphite electrode plasma arc (A.C. or D.C.) systems, have been proposed to generate the plasma arc for the hazardous waste destruction or conversion processes.

Systems employing a plasma torch are generally not as energy efficient as those using graphite electrodes due to higher energy loss to the plasma torch cooling water. The efficiency of plasma torches is usually less than 70% especially when the metal plasma torch is placed and operated inside a hot reactor/vessel. Therefore, plasma torches are only effective for gas heating and specialty material processing or fabrication, and they are not practical and economical for material melting. Furthermore, when air is used as the plasma working gas, nitrogen oxides ($NO_x$) and hydrogen cyanide (HCN) are produced due to the reactions of the nitrogen in the air plasma working gas with the oxygen and the hydrocarbons in the vessel/reactor at high temperatures. Furthermore, the steam generated in the vessel will condense on the surface of the metal shroud of the plasma torch. Consequently, carbon black/soot along with the non-dissociated toxic materials will deposit and accumulate on the cold wet metal shroud leading to incomplete destruction of the hazardous wastes. When the plasma torch is removed from the vessel for maintenance, workers are then subject to the exposure to the toxic materials.

The lifetime of the electrodes and the stability (performance) of the plasma arc generated by plasma torches also depend on the atmosphere inside the vessel/reactor. Therefore, the operation of plasma torch systems is more complicated than that of graphite electrode plasma arc systems. Metal plasma torches require high-pressured cooling water for cooling of the internal components. The chemistry and the electrical conductivity of the cooling water must be monitored and adjusted in order to prevent chemical corrosion and mineral depositions inside the torch. Those requirements necessitate expensive auxiliary equipment which increases the capital and operating costs.

Other systems employ graphite electrode electric plasma arc technologies. These systems can lead to either severe oxidation of the graphite electrodes or excessive formation of fine carbon black/soot in the byproduct gas stream. A combined A.C. and D.C. graphite electrodes system was developed to provide electric arc generation and joule resistance heating in the bath simultaneously. Other technologies employ concentric electrodes system and single top D.C. graphite electrode with a conductive bottom for melting and gasification. However, the electrical conductivity of the bottom electrode must be maintained at all times in the single top D.C. graphite electrode system especially when the bottom electrode of the cold vessel/reactor is covered by a layer of slag which is not electrically conductive at low temperatures.

It has been found that the kinetic of carbon black formation was very high during high temperature cracking of hydrocarbons under a slightly reducing condition. Therefore, carbon black/soot is always produced in the reducing plasma arc gasification process and must be removed prior to the downstream air pollution control system. Increasing the residence time of the by-products inside the vessel/reactor or increasing the operating temperature assists in removing carbon black. However, increasing residence time necessitates the use of a larger apparatus or reducing the throughput of feed waste. Accordingly, some systems have been proposed which include an afterburner or thermal oxidizer to increase the reaction kinetics by the turbulent environment as a secondary gas treatment process to ensure complete combustion. However, air and fuel are used in these methods to generate the high heat for the oxidation process. Consequently, a secondary waste stream such as nitrogen oxides may be produced in these systems under such an oxidizing atmosphere.

It would be advantageous to have a system and method for treating the off-gas from waste treatment systems that, at least in part, address these shortcomings.

SUMMARY OF THE INVENTION

The present invention provides a system for treating the off-gas from a waste treatment system, such as a graphite electrode arc gasification system, that reduces the carbon black present in the off-gas while avoiding the production of nitrogen oxides and other pollutants. The system includes an afterburner using a plasma torch having a nitrogen-free working gas, which, in one embodiment, is a carbon dioxide and oxygen mixture. The plasma arc ionizes the working gas, thereby creating atomic oxygen, which assists in the removal of carbon black from the off-gas.

In one aspect, the present invention provides an apparatus for treating an off-gas from a waste treatment system. The apparatus includes a refractory-lined cylindrical chamber having an input port for receiving the off-gas and an output port, and a DC powered plasma torch proximate the input port within the chamber, the torch receiving a working gas, the working gas including a mixture of carbon dioxide and oxygen. The plasma torch heats the chamber and the off-gas is thereby converted to an output gas, which is ejected through the output port.

In another aspect, the present invention provides a method for treating an off-gas from a waste treatment system. The method includes the steps of receiving the off-gas at an input port of a refractory-lined cylindrical chamber, heating the chamber by ionizing a working gas using a DC powered plasma torch proximate the input port within the chamber, the working gas including a mixture of carbon dioxide and oxygen, thereby converting the off-gas to an output gas, and outputting an output gas from the chamber.

In a further aspect, the present invention provides a waste treatment system for treating hazardous wastes. The waste treatment system includes a primary waste treatment stage that receives the hazardous waste and produces a by-product off-gas, and a secondary waste treatment stage coupled to the primary waste treatment stage and receiving the off-gas. The secondary waste treatment stage includes a refractory-lined cylindrical chamber having an input port for receiving the off-gas and an output port, and a DC powered plasma torch proximate the input port within the chamber, the torch receiving a working gas, the working gas including a mixture of carbon dioxide and oxygen. The plasma torch heats the chamber and the off-gas is thereby converted to an output gas, which is ejected through the output port.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show an embodiment of the present invention, and in which.

Similar numerals are used in different figures to denote similar components.

DESCRIPTION OF SPECIFIC EMBODIMENTS

Figure 1:
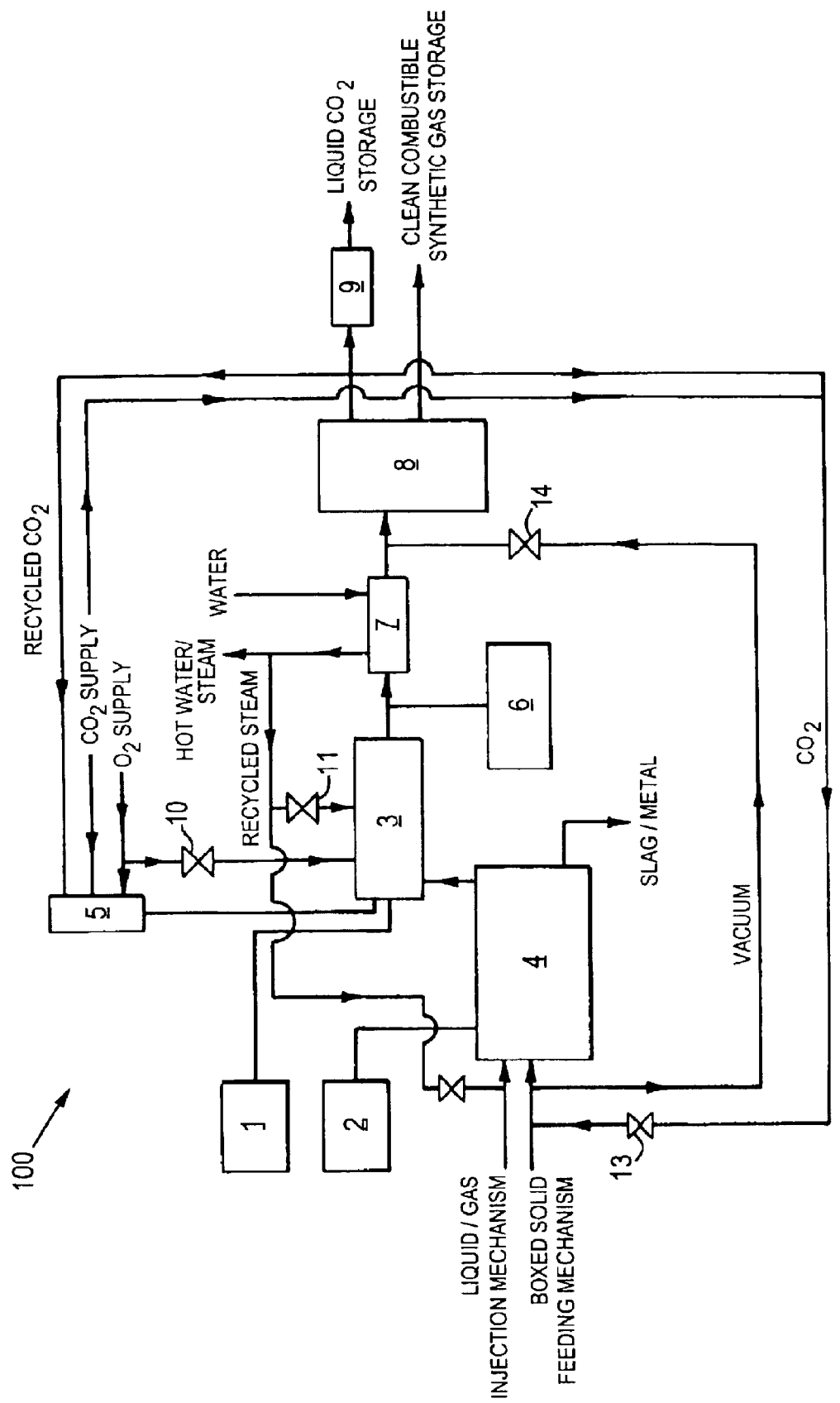
FIG. 1 shows a diagram of a waste treatment system, according to the present invention.
Figure 2:
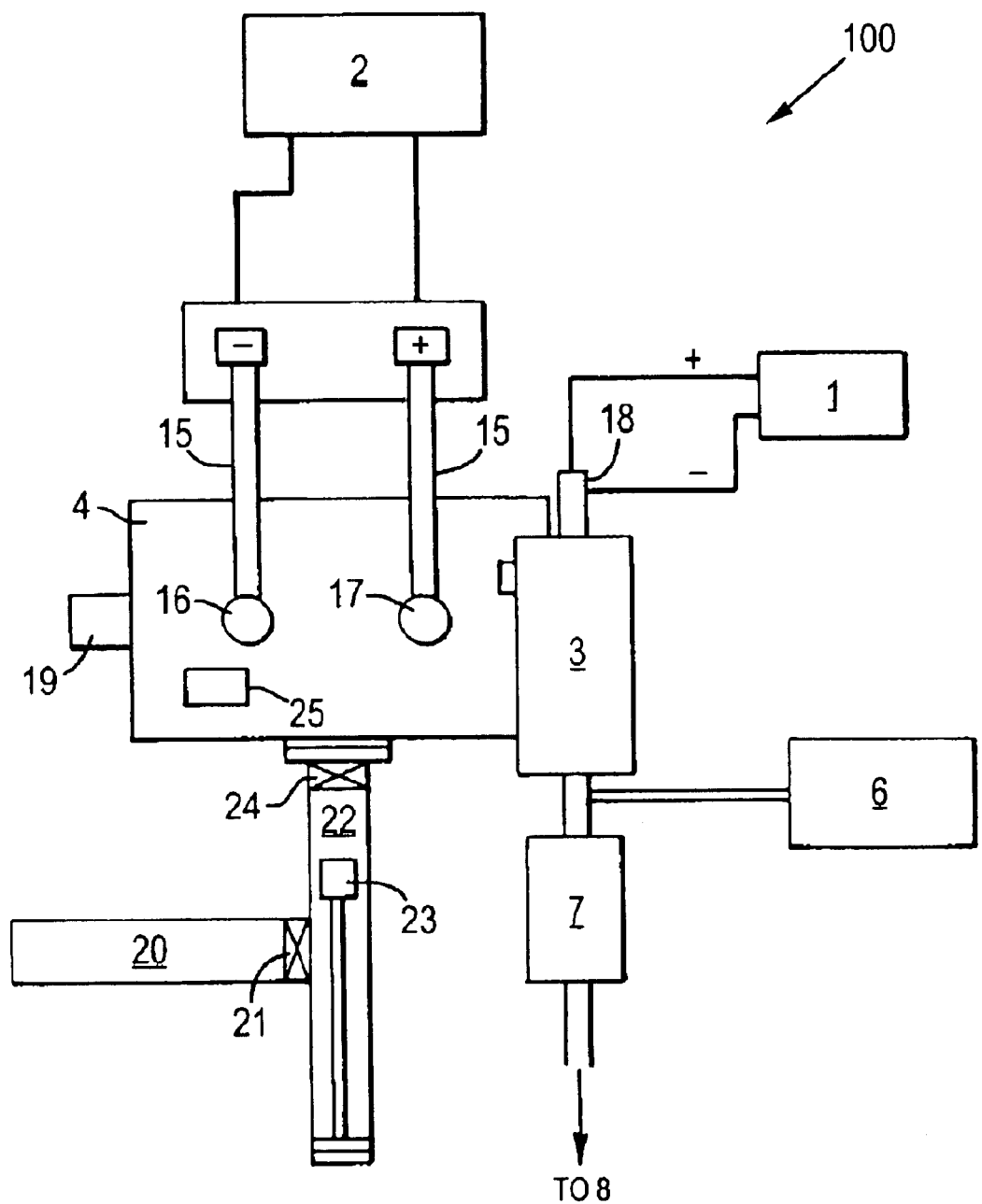
FIG. 2 shows a top plan view block diagram of the waste treatment system.

Reference is first made to FIG. 1, which shows a diagram of a waste treatment system 100, according to the present invention, and FIG. 2, which shows a top plan view block diagram of the waste treatment system 100. The system 100 includes a graphite electrode D.C. plasma arc gasifier/melter 4 and a plasma torch cyclonic oxidizer 3. Waste material is inserted into the gasifier/melter 4, which melts the non-combustible materials and disassociates the organic materials. The gasifier/melter 4 produces off-gas, which is routed to the cyclonic oxidized. The cyclonic oxidizer 3 then treats the off-gas, in accordance with the resent invention. The gasifier/melter 4 may also be referred to as a gasification/vitrification chamber.

Prior to feeding hazardous waste into the graphite electrode D.C. arc gasifier/melter 4 for destruction, the gasifier/melter 4 is preheated to a temperature above 1500° C. by melting scrap steel in the gasifier/melter 4. The gasifier/melter 4 is refractory lined, and the sidewalls and the roof of the D.C. arc gasifier/melter 4 are water cooled to extend the refractory life by minimizing mechanical erosion and chemical corrosion by the melt. The refractory system serves to contain the melt and minimize heat losses from the gasifier/melter 4. The refractory is also chemically compatible to the slag and by-product gas generated.

As shown in FIG. 2, two graphite electrodes penetrate through the roof of the gasifier/melter 4. Electrode clamps 16 and 17 hold the graphite electrodes and are connected to a D.C. power supply 2. Electrode clamp 16 is connected to the cathode, and electrode clamp 17 is connected to the anode of the power supply 2. The electrode clamps 16 and 17 are coupled to electrode arms 15 as part of an automatic responsive electrode guiding system which moves the electrode arms 15. The automatic responsive electrode guiding system moves the electrode arms 15 so as to adjust the position of the two graphite electrodes relative to each other and relative to the molten material at the hearth in the gasifier/melter 4. Adjusting the relative position of the graphite electrodes affects the arc length. An electrode seal on the roof is used to allow adjustment of the electrodes while preventing ambient air from entering and by-product gas from escaping the D.C. arc gasifier/melter 4.

A view port 25 in the gasifier/melter 4 allows for the even insertion of scrap steel. The anode electrode held by the electrode clamp 17 is buried in the scrap steel, and the cathode electrode held by the electrode clamp 16 is positioned above the solid scrap steel. Then the cathode electrode is slowly lowered until an electric arc is established between the cathode electrode and the scrap steel. The scrap steel begins to melt to form a molten bath at a temperature above 1500° C. When the scrap steel is completely melted at the hearth, the cathode electrode is then raised to achieve long arc length and the anode electrode remains submerged in the molten bath.

The system 100 includes a feeding mechanism for introducing hazardous solid wastes into the gasifier/melter 4. In another embodiment, instead of directly receiving solid hazardous wastes, the gasifier/melter 4 may receive toxic by-products from a main chemical or incineration processes. The main chemical or incineration process generates toxic by-products which are reduced to a non-toxic stable slag in the gasifier/melter 4.

In the present embodiment, the feeding mechanism includes a conveyor 20 and a gas-tight chamber 22 which is connected to the gasifier/melter 4. A gas-tight gate 21 separates the conveyor 20 and the gas-tight chamber 22, and a water-cooled gas-tight door 24 separates the gas-tight chamber 22 and the gasifier/melter 4.

Wastes may be delivered via the conveyor 20 to the gas-tight chamber 22 through the gas-tight gate 21. After a batch of wastes has been delivered into the gas-tight chamber 22, the gas-tight gate 21 is then closed. The gas-tight chamber 22 is then vacuumed to remove the air in the gas-tight chamber 22 by opening a vacuum control valve 14. Then the vacuum control valve 14 is closed and a carbon dioxide control valve 13 is opened to back fill the gas-tight chamber 22 with carbon dioxide to prevent by-product gas from coming out of the D.C. arc gasifier/melter 4 when the water cooled gas-tight door 24 begins to open. The gas-tight chamber 22 includes a high temperature resistance hydraulic ram 23 for propelling the wastes forward in the gas-tight chamber 22. When the gas-tight door 24 is fully opened, the ram 23 pushes the wastes into the D.C. arc gasifier/melter 4 through a chute in the sidewall or the roof. Once the wastes are pushed into the gasifier/melter 4, the ram 23 retracts to its original position in the gas-tight chamber 22. The water-cooled gas-tight door 24 is then closed, the valve 13 is closed and the vacuum valve 14 is opened to remove the carbon dioxide in the gas-tight chamber 22 until the gas-tight gate 21 begins to open to receive further wastes from the conveyor 20 to complete a feeding cycle for the solid wastes.

For liquid and gaseous hazardous wastes, the waste is metered and pumped through a retractable high temperature resistance atomizing nozzle in the sidewall onto the molten bath in the D.C. arc gasifier/melter 4. Steam is used as a carrier gas and to purge the liquid/gas feed line for cleansing.

Inside the gasifier/melter 4, the wastes are exposed to an extreme high heat atmosphere and the electric arc generated between the cathode electrode 16 and the molten iron. The organic matters in the waste are dissociated to their atomic forms. Due to the extreme high temperature condition, the formation of dioxin/furan can be completely prevented. The non-combustible matters including metals and glasses are melted and mixed with the molten iron to produce liquid slag and metal at the hearth. The slag and metal are removed occasionally from the D.C. arc gasifier/melter 4 by opening a tap hole 19 with a drill. Thermocouples are installed in the sidewalls, the roof and the bottom to monitor the freeboard and refractory temperature. If the refractory and freeboard temperatures begin to decrease, the power to the electrodes is increased by increasing the current or the voltage to the cathode electrode. The pressure inside the D.C. arc gasifier/melter 4 is maintained at negative to avoid by-product gas release to the ambient atmosphere by an exhaust fan of an air pollution control system 8.

Gas produced by the gasifier/melter 4 is treated in the cyclonic oxidizer 3. The cyclonic oxidizer 3 is coupled to the gasifier/melter 4 so as to receive by-product gas produced by the gasifier/melter 4. The by-product gas generated in the D.C. arc gasifier/melter 4, in one embodiment, may include carbon monoxide, hydrogen, light hydrocarbons, carbon black and a small quantity of carbon dioxide. Carbon black/soot always presents a serious operation problem in the downstream energy recovery and air pollution control systems because of its fine particle size. Furthermore, the carbon black/soot can act as a nucleation site for the reformation of the toxic organic compounds. This off-gas enters the cyclonic oxidizer 3 tangentially at very high velocity, thereby creating a cyclonic condition within the cyclonic oxidizer 3. In one embodiment, the cyclonic oxidizer 3 is disposed approximately horizontally, with a slight downward slope from an upstream end to a downstream end.

Figure 3:
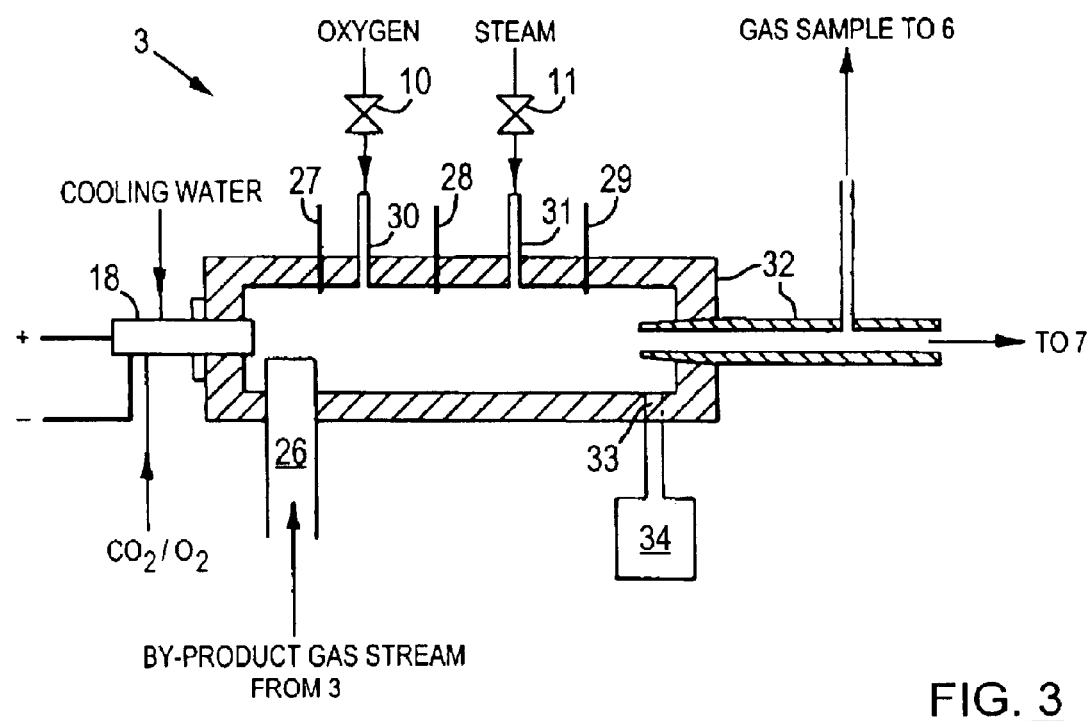
FIG. 3 shows a cross-sectional view of a cyclonic oxidizer, according to the present invention.

Reference is now made to FIG. 3, which shows a cross-sectional view of the cyclonic oxidizer 3, according to the present invention. A straight vertical refractory lined off-gas pipe 26 is used to connect the D.C. arc gasifier/melter 4 and the cyclonic oxidizer 3. The off-gas pipe 26 injects by-product gas tangentially into the bottom side of the cyclonic oxidizer 3 near its upstream end. The straight vertical off-gas pipe 26 minimizes the pressure drop between the D.C. arc gasifier/melter 4 and the cyclonic oxidizer 3 in order to improve the off-gas stream flow into the cyclonic oxidizer 3. The oxidization reaction efficiency is increased by the intense internal mixing between the by-product gas and injected atomized oxygen and steam caused by the vigor of the cyclonic action within the cyclonic oxidizer 3.

In another embodiment, the cyclonic oxidizer 3 treats off-gas generated from a main chemical reaction or incineration process, in which case the off-gas is delivered directly to the cyclonic oxidizer 3. In such a case, the gasifier/melter 4 may be unnecessary.

The cyclonic oxidizer 3 includes a D.C. plasma torch 18 located at its upstream end. The plasma torch 18 preheats the cyclonic oxidizer to above 1300° C. The D.C. plasma torch 18 is powered from a D.C. power supply 1. The D.C. power supply 1 for the plasma torch 18 is, in one embodiment, separate from the D.C. power supply 2 for the gasifier/melter 4 so as to ensure that the cyclonic oxidizer 3 continues to operate if the gasifier/melter 4 power supply 2 fails. The cyclonic oxidizer 3 is lined with refractory 32 and thermocouples 27, 28 and 29 are installed along the inner refractory 32 face to monitor the hot face temperatures. If the temperatures fall below 1350° C. during the treatment process, the power to the plasma torch 18 or the oxygen injection is increased. Operation of the plasma torch 18 may be controlled by a process controller 6 (FIG. 2) through a feedback loop. The process controller 6 may include a microcontroller suitably programmed to execute a set of instructions or functions for implementing control steps and providing control signals, according to the present invention.

The plasma torch 18 employs a mixture of carbon dioxide and oxygen as the plasma working gas. The gases are initially mixed in a dynamic mixer 5 that responsively regulates the composition of the gas mixture and controls the gas mixture flowrate according to the desired operating conditions and the plasma gas requirement. In one embodiment, the oxygen content in the gas mixture is 15% to 25% by volume, and is preferably 21%. An oxygen sensor is included in the dynamic mixer 5 to monitor the oxygen content in the gas mixture. The use of carbon dioxide and oxygen as the plasma working gas avoids the formations of nitrogen oxides and hydrogen cyanide. The dynamic mixer 5 may receive control signals from the process controller 6.

When the gas mixture is ionized in the plasma arc zone where temperature exceeds 5000° C., the carbon dioxide is dissociated to carbon monoxide and atomic oxygen which is very reactive. Combining the presence of reactive atomic oxygen and the enhanced turbulent environment inside the cyclonic oxidizer 3, carbon black/soot and the fugitive toxic materials in the by-product gas can be effectively converted and destroyed. The particulates in the by-product gas are melted to form a molten layer retained on the sidewall by the centrifugal force created by the cyclone action in the cyclonic oxidizer 3. The molten material flows down to the lower-stream side bottom, which is equipped with a spout 33 coupled to a container 34 to receive the molten material. The molten materials then solidify in the container 34 and are removed and returned to the D.C. arc gasifier/melter 4 for slag vitrification.

Oxygen and steam are metered and injected into the cyclonic oxidizer 3 as an oxidizing agent through control valves 10 and 11. The gases are atomized by high temperature resistance atomizing nozzles 30 and 31. The process controller 6 includes an on-line off-gas monitoring sensor to analyse the by-product gas composition for carbon monoxide, hydrogen, hydrocarbons and carbon dioxide. From the data analysed, the process controller 6 quickly sends a process control signal to the control valves 10 and 11 to control the oxygen and steam injections. With low heating value wastes, the cyclonic oxidizer 3 converts the by-product gas completely to water and carbon dioxide to produce a clean exhaust gas to the atmosphere by increasing the oxygen and or steam injection until the total concentration of light hydrocarbons and carbon monoxide is less than 20 ppm. With high heating value wastes, the final by-product gas can be a high quality combustible synthetic gas for electricity generation. When the concentration of the carbon dioxide is above 3%, the steam and/or oxygen injection is decreased. And, when the concentration of the carbon dioxide is below 1%, the oxygen and steam injection is increased.

Referring again to FIG. 1, the sensible heat in the by-product gas generated from the cyclonic oxidizer 3 is recovered by a heat exchanger 7 to produce hot water or steam for improving the overall process efficiency. The steam is recycled to the liquid/gas waste feeding system as the carrier gas and the cyclonic oxidizer 3 as an oxidizing agent. The cooled gas is treated by the air pollution control system 8 before the final product gas is stored as a combustible synthetic gas that contains mainly hydrogen and carbon monoxide, or the final product gas is compressed in a compressor 9 to produce a liquefied carbon dioxide.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for treating an off-gas from a waste treatment system, comprising the steps of:
   (a) receiving the off-gas at an input port of a refractory-lined cylindrical chamber;
   (b) heating said chamber by ionizing a working gas using a DC powered plasma torch proximate the input port within said chamber, said working gas including a mixture of carbon dioxide and oxygen and excluding nitrogen, thereby converting said off-gas to an output gas; and
   (c) outputting the output gas from said chamber.

2. The method claimed in claim 1, wherein said mixture of carbon dioxide and oxygen includes between 15% and 25% oxygen by volume.

3. The method claimed in claim 1, further including a step of injecting atomized oxygen and atomized steam into said chamber.

4. The method claimed in claim 3, further including the steps of analyzing the content of said output gas and controlling said injection of oxygen and steam based upon said step of analyzing.

5. The method claimed in claim 4, further including a step of mixing an oxygen gas supply and a carbon dioxide gas supply to create said working gas in a dynamic mixer.

6. The method claimed in claim 1, wherein said step of ionizing is conducted in a plasma zone at an operating temperature greater than 5000° C.

7. The method claimed in claim 1, further including a step of measuring the temperature within said chamber, wherein said temperature is maintained at greater than 1300° C.

8. The method claimed in claim 1, wherein said working gas consists essentially of carbon dioxide and oxygen.

9. The method claimed in claim 8, wherein said working gas consists of carbon dioxide and oxygen.

10. An apparatus for treating an off-gas from a waste treatment system, comprising
    (a) a refractory-lined cylindrical chamber having an input port for receiving the off-gas and an output port; and
    (b) a DC powered plasma torch proximate the input port within said chamber, said torch receiving a working gas, said working gas including a mixture of carbon dioxide and oxygen and excluding nitrogen;
    wherein said plasma torch heats said chamber and the off-gas is thereby converted to an output gas, which is ejected through said output port.

11. The apparatus claimed in claim 10, wherein said mixture of carbon dioxide and oxygen includes between 15% and 25% oxygen by volume.

12. The apparatus claimed in claim 10, further including an oxygen injector in communication with said chamber for injecting atomized oxygen and a steam injector in communication with said chamber for injecting atomized steam.

13. The apparatus claimed in claim 12, wherein said oxygen injector and said steam injector include heat resistant atomizing nozzles in fluid communication with said chamber.

14. The apparatus claimed in claim 12, further including a sensor coupled to said output port for analyzing the content of said output gas, and a process controller coupled to said sensor for receiving data from said sensor and coupled to said injectors for controlling the injection of oxygen and steam.

15. The apparatus claimed in claim 14, further including a dynamic mixer coupled to said plasma torch and providing said working gas, said mixer receiving an oxygen gas supply and a carbon dioxide gas supply, wherein said mixer mixes said gas supplies in response to control signals from said process controller.

16. The apparatus claimed in claim 10, wherein said plasma torch includes a plasma zone operating at a temperature greater than 5000° C.

17. The apparatus claimed in claim 10, further including temperature sensors within said chamber, and wherein the temperature within said chamber is maintained at greater than 1300° C.

18. The apparatus claimed in claim 10, wherein said chamber is disposed horizontally and wherein said chamber includes an upstream end, a downstream end, and a sidewall therebetween.

19. The apparatus claimed in claim 18, wherein said plasma torch penetrates said upstream end, said input port includes an inlet pipe, and said inlet pipe penetrates said sidewall tangentially and proximate said upstream end.

20. The apparatus claimed in claim 10, wherein said working gas consists essentially of carbon dioxide and oxygen.

21. The apparatus claimed in claim 20, wherein said working consists of carbon dioxide and oxygen.

22. A waste treatment system for treating hazardous waste, comprising:
    (a) a primary waste treatment stage, said primary waste treatment stage receiving the hazardous waste and producing a by-product off-gas;
    (b) a secondary waste treatment stage coupled to said primary waste treatment stage and receiving said off-gas, said secondary waste treatment stage including:
       (i) a refractory-lined cylindrical chamber having a input port for tangentially receiving said off-gas and an output port; and
       (ii) a DC powered plasma torch proximate the input port within said chamber, said torch receiving a working gas, said working gas including a mixture of carbon dioxide and oxygen and excluding nitrogen;
    wherein said plasma torch heats said chamber and said off-gas is thereby converted to an output gas, which is ejected through said output port.

23. The waste treatment system claimed in claim 22, wherein said mixture of carbon dioxide and oxygen includes between 15% and 25% oxygen by volume.

24. The waste treatment system claimed in claim 22, wherein said primary waste treatment stage includes a gasification/vitrification chamber and a conveyor system coupled to said gasification/vitrification chamber through a gas-tight door, said conveyor system feeding solid hazardous wastes into said gasification/vitrification chamber.

25. The waste treatment system claimed in claim 22, wherein said primary waste treatment system includes a gasification/vitrification chamber and an inlet pipe coupled to said gasification/vitrification chamber, said inlet pipe feeding liquid or gaseous hazardous wastes into said gasification/vitrification chamber.

26. The waste treatment system claimed in claim 22, wherein said primary waste treatment stage includes a graphite electrode plasma arc gasifier/melter.

27. The waste treatment system claimed in claim 26, wherein said graphite electrode plasma arc gasifier/melter includes a pair of spaced apart graphite electrodes, each held by a respective electrode clamp attached to a movable electrode arm, wherein said electrode aims are operable to adjust the relative distance between said pair of spaced apart graphite electrodes or between said electrodes and a molten material within said graphite electrode plasma arc gasifier/melter, thereby adjusting the arc length.

28. The waste treatment system claimed in claim 22, wherein said working gas consists essentially of carbon dioxide and oxygen.

29. The waste treatment system claimed in claim 28, wherein said working gas consists of carbon dioxide and oxygen.

* * * * *